July 5, 1938.    H. H. BUBAR    2,122,511
DUST COLLECTING APPARATUS
Filed June 8, 1937
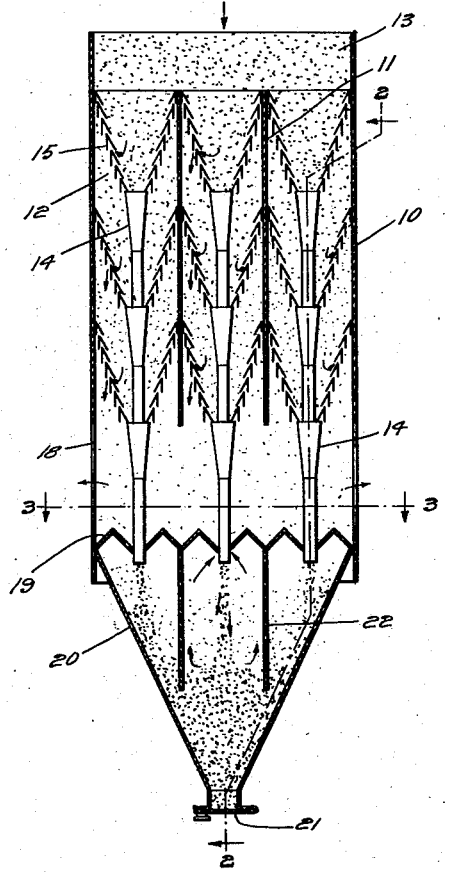
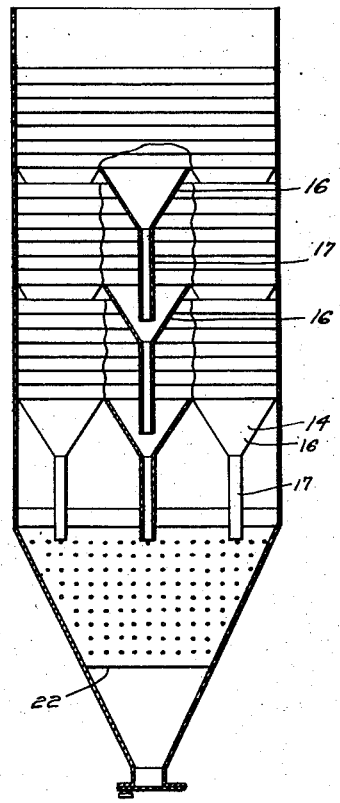
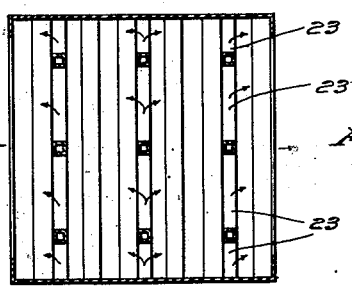
Inventor
Hudson H. Bubar
By Nathaniel Frucht
Attorney Patented July 5, 1938

2,122,511

UNITED STATES PATENT OFFICE 2,122,511

DUST COLLECTING APPARATUS

Hudson H. Bubar, New York, N. Y.

Application June 8, 1937, Serial No. 147,073

10 Claims. (Cl. 183—105)

My present invention relates to the art of dust collecting and has particular reference to the construction and operation of dust collecting apparatus.

The principal object of my invention is to provide an efficient dust collector capable of collecting both heavy and fine dust. It is a further object of my invention to provide a dust collector which has a very low draft loss, and which may therefore be used with minimum fan power requirements or with natural draft equipment.

It is an additional object of my invention to provide a rust collector which is not subject to abrasion of the collector elements, and which has no moving parts.

Another object of my invention is to provide a relatively light weight dust collector which occupies a small amount of space, whereby the dust collecting apparatus may be readily installed in cramped quarters such as are ordinarily available in city power plants.

With the above and other objects and advantageous features in view, my invention consists of a novel apparatus more fully disclosed in the detailed description following, in conjunction with the accompanying drawing, and more specifically defined in the claims appended thereto.

In the drawing:

Fig. 1 is a vertical central section of the novel dust collector;

Fig. 2 is a section on the line 2—2 thereof, parts being broken away, and

Fig. 3 is a section on the line 3—3 of Fig. 1.

Referring to the drawing, the novel dust collecting apparatus comprises a vertical housing 10, preferably of rectangular form, and divided by vertical spaced partitions 11 into a plurality of separate flow chambers 12 communicating at their upper ends with a common inlet chamber 13. Each flow chamber has a plurality of funnel shaped collectors 14, each collector being position at the apex of a deflector unit consisting of a plurality of spaced deflectors 15 arranged in downwardly pointing V shape, each collector 14 having an enlarged upper portion 16 and a narrow lower portion 17 which seats within the upper portion 16 of the collector positioned thereunder. The partitions 11, see Fig. 1, terminate just above the last row of collectors and suitable openings 18 are provided in the sides of the housing to permit free outlet of cleaned gases. Angle plates 19 are provided at the lower end of the housing 10, and form the top of a dust receiver 20, preferably of inverted pyramid form, which has an operable trap door 21 at its apex to permit removal of collected dust. Vertical partitions 22 depending from the plate 19 are provided to divide the dust receiving chamber into a plurality of separate chambers, these partitions being perforated as indicated in Fig. 2 to break up the gas streams. As will be noted from Figs. 1 and 3, the plates 19 are spaced to receive the lower ends of the bottom collectors 14 therethrough, and openings 23 are provided between said collectors, whereby gas passing through the collectors with the entrained dust may escape upwardly to join the air exiting through the outlets 18.

Referring now to Fig. 1, the deflectors 15 are preferably formed of angle bars which are displaced laterally and vertically so as to form V shaped guide passages for the gas, and to converge into the upper portion 16 of the dust collectors, the gas being free to flow between the deflector units, but being constrained to follow a tortuous path as indicated by the arrows whereby the dust particles in the gas will separate by gravity and by deflection and enter into the collectors 14. Dust laden gas which enters into the inlet 13 is thus divided in a plurality of separate streams, each stream passing serially through the sets of deflectors 15, the purified gas entering into the lower chamber below the partitions 11 and exiting through the openings 18; any gas which passes downwardly through the collectors 14 with the entrained dust flows into the dust receiver 20 and has its velocity broken by the perforations in the partitions 22, the gas then rising upwardly through the openings 23 to rejoin the main purified gas which has passed through the separate flow passageways.

It is thus evident that the novel dust collecting apparatus consists of an upright housing which receives dust laden gas, divides the dust laden gas into a plurality of separate streams, cleans each separate stream serially by gravity and by deflection, and permits the cleaned gas to exit at the lower portion of the apparatus. Although specific angle bars of generally V shape have been disclosed, it is obvious that any type of deflector plate may be used, for guiding the gas flow between adjacent plates upwardly and then downwardly so as to produce deflector separation by sharp turning of the gas currents, aided by gravity separation. The device is easily manufactured, uses a small number of readily assembled parts, interposes very little draft load, and is of relatively light weight. Moreover, the collector apparatus may be made of any size and may be readily changed to meet additional loads, as the addition of one or more collectors is a relatively simple procedure.

The above described apparatus has been found to have a high collection efficiency; for example, this type of apparatus has obtained 80% to 85% recovery of all ash entering the apparatus and resulting from the combustion of pulverized fuel or other extremely light and fine dust.

While I have described a specific constructional embodiment of my invention, it is obvious that changes in the number and relative amount of the parts and in the type of deflectors and of funnel collectors used, may be made to suit the requirements for different dust collecting operations, without departing from the spirit and the scope of the invention as defined in the appended claims.

I claim:

1. A housing having a dust receiving chamber and a deflector unit, the top of said deflector unit being spaced from the top of said housing to provide an inlet chamber communicating with an inlet in the top of said housing and the bottom of said deflector unit being spaced from said dust receiving chamber to provide an outlet chamber communicating with an outlet in the side of said housing, said deflector unit comprising a spaced series of deflector elements arranged in V-shape and collector funnel means at the apex of said deflector unit, said collector funnel means extending through said outlet chamber and into said dust receiving chamber.

2. A housing having a dust receiving chamber and a deflector unit, the top of said deflector unit being spaced from the top of said housing to provide an inlet chamber communicating with an inlet in the top of said housing and the bottom of said deflector unit being spaced from said dust receiving chamber to provide an outlet chamber communicating with an outlet in the side of said housing, said deflector unit comprising a spaced series of deflector elements arranged in V-shape and collector funnel means at the apex of said deflector unit, said collector funnel means extending through said outlet chamber and into said dust receiving chamber, said dust receiving chamber having a vent communicating with said outlet chamber to permit gas entering through said funnel means to return to said outlet chamber.

3. A housing having a dust receiving chamber and a plurality of deflector units, said deflector units being spaced from the top of said housing to provide an inlet chamber communicating with an inlet in the top of said housing and said deflector units being spaced from said dust receiving chamber to provide an outlet chamber communicating with an outlet in the side of said housing, said deflector units being arranged in series and each comprising a spaced series of deflector elements arranged in V-shape and collector funnel means at the apex of each deflector unit, the last collector funnel means extending through said outlet chamber and into said dust receiving chamber.

4. A housing having a dust receiving chamber and a plurality of deflector units, said deflector units being spaced from the top of said housing to provide an inlet chamber communicating with an inlet in the top of said housing and said deflector units being spaced from said dust receiving chamber to provide an outlet chamber communicating with an outlet in the side of said housing, said deflector units being arranged in series and each comprising a spaced series of deflector elements arranged in V-shape and collector funnel means at the apex of each deflector unit, the last collector funnel means extending through said outlet chamber and into said dust receiving chamber, said dust receiving chamber having a vent communicating with said outlet chamber to permit gas entering through said funnel means to return to said outlet chamber.

5. A housing having a dust receiving chamber and partitions dividing said housing into parallel flow chambers each having a deflector unit, said partitions being spaced from the top of said housing to provide an inlet chamber communicating with an inlet in the top of said housing and said partitions being spaced from said dust receiving chamber to provide an outlet chamber communicating with an outlet in the side of said housing, each of said deflector units comprising a spaced series of deflector elements arranged in V-shape and collector funnel means at the apex of said deflector unit, said collector funnel means extending through said outlet chamber and into said dust receiving chamber.

6. A housing having a dust receiving chamber and partitions dividing said housing into parallel flow chambers each having a deflector unit, said partitions being spaced from the top of said housing to provide an inlet chamber communicating with an inlet in the top of said housing and said partitions being spaced from said dust receiving chamber to provide an outlet chamber communicating with an outlet in the side of said housing, each of said deflector units comprising a spaced series of deflector elements arranged in V-shape and collector funnel means at the apex of said deflector unit, said collector funnel means extending through said outlet chamber and into said dust receiving chamber, said dust receiving chamber having a vent communicating with said outlet chamber to permit gas entering through said funnel means to return to said outlet chamber.

7. A housing having a dust receiving chamber and partitions dividing said housing into parallel flow chambers each having a plurality of deflector units arranged in series, said partitions being spaced from the top of said housing to provide an inlet chamber communicating with an inlet in the top of said housing and said partitions being spaced from said dust receiving chamber to provide an outlet chamber communicating with an outlet in the side of said housing, each of said deflector units comprising a spaced series of deflector elements arranged in V-shape and collector funnel means at the apex of each deflector unit, the last collector funnel means extending through said outlet chamber and into said dust receiving chamber.

8. A housing having a dust receiving chamber and partitions dividing said housing into parallel flow chambers each having a plurality of deflector units arranged in series, said partitions being spaced from the top of said housing to provide an inlet chamber communicating with an inlet in the top of said housing and said partitions being spaced from said dust receiving chamber to provide an outlet chamber communicating with an outlet in the side of said housing, each of said deflector units comprising a spaced series of deflector elements arranged in V-shape and collector funnel means at the apex of each deflector unit, the last collector funnel means extending through said outlet chamber and into said dust receiving chamber, said dust receiving chamber having a vent communicating with said outlet chamber to permit gas entering through said funnel means to return to said outlet chamber.

9. A housing having a dust receiving chamber and partitions dividing said housing into parallel flow chambers each having a deflector unit, said partitions being spaced from the top of said housing to provide an inlet chamber communicating with an inlet in the top of said housing and said partitions being spaced from said dust receiving chamber to provide an outlet chamber communicating with an outlet in the side of said housing, each of said deflector units comprising a spaced series of deflector elements arranged in V-shape and collector funnel means at the apex of said deflector unit, said collector funnel means extending through said outlet chamber and into said dust receiving chamber, said dust receiving chamber having partitions dividing the dust receiving chamber into parallel collecting chambers aligned with the parallel flow chambers.

10. A housing having a dust receiving chamber and partitions dividing said housing into parallel flow chambers each having a plurality of deflector units arranged in series, said partitions being spaced from the top of said housing to provide an inlet chamber communicating with an inlet in the top of said housing and said partitions being spaced from said dust receiving chamber to provide an outlet chamber communicating with an outlet in the side of said housing, each of said deflector units comprising a spaced series of deflector elements arranged in V-shape and collector funnel means at the apex of each deflector unit, the last collector funnel means extending through said outlet chamber and into said dust receiving chamber.

HUDSON H. BUBAR.